US 6,693,513 B2

(12) United States Patent
Tuttle (10) Patent No.: US 6,693,513 B2
(45) Date of Patent: *Feb. 17, 2004

(54) WIRELESS IDENTIFICATION DEVICE, RFID DEVICE WITH PUSH-ON/PUSH OFF SWITCH, AND METHOD OF MANUFACTURING WIRELESS IDENTIFICATION DEVICE (75) Inventor: Mark E. Tuttle, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/117,737

(22) Filed: Apr. 1, 2002

(65) Prior Publication Data

US 2002/0140546 A1 Oct. 3, 2002

Related U.S. Application Data (63) Continuation of application No. 08/943,889, filed on Oct. 3, 1997.

(51) Int. Cl.⁷ .................................................. H04Q 1/00
(52) U.S. Cl. ................ 340/10.1; 340/572.1; 340/572.3; 341/20
(58) Field of Search ........................... 340/572.1, 10.1, 340/10.2, 10.3, 825.49, 572.3; 341/20

(56) References Cited

U.S. PATENT DOCUMENTS

| | | | |
|---|---|---|---|
| 3,703,714 A | 11/1972 | Andrews | |
| 4,075,632 A | 2/1978 | Baldwin et al. | |
| 4,242,671 A | 12/1980 | Plows | |
| 4,369,557 A | 1/1983 | Vandebult | |
| 4,384,288 A | 5/1983 | Walton | |
| 4,501,938 A | 2/1985 | Kawauchi | |
| 4,509,093 A | 4/1985 | Stellberger | |
| 4,568,918 A | 2/1986 | Edel | |
| 4,918,425 A | * 4/1990 | Greenberg et al. | ....... 340/572.1 |
| 4,926,182 A | 5/1990 | Ohta et al. | |
| 4,940,245 A | 7/1990 | Bittle, Jr. | |
| 5,019,801 A | 5/1991 | Anderson, III | |
| 5,113,184 A | 5/1992 | Katayama | |
| 5,136,131 A | 8/1992 | Komaki | |
| 5,299,227 A | 3/1994 | Rose | |
| 5,319,364 A | * 6/1994 | Waraksa et al. | ........... 340/5.64 |
| 5,379,033 A | 1/1995 | Jujii et al. | |
| 5,448,110 A | 9/1995 | Tuttle et al. | |
| 5,525,992 A | 6/1996 | Froschermeier | |
| 5,621,412 A | 4/1997 | Sharpe et al. | |
| 5,649,296 A | 7/1997 | MacLellan et al. | |
| 5,764,180 A | * 6/1998 | Cummings | .................... 341/20 |
| 5,852,289 A | 12/1998 | Masahiko | |
| 5,917,423 A | * 6/1999 | Duvall | ................. 340/825.49 |
| 5,926,094 A | 7/1999 | Mamou | |
| 5,937,512 A | 8/1999 | Lake et al. | |
| 5,942,978 A | 8/1999 | Shafer | |
| 5,952,937 A | * 9/1999 | Koopman, Jr. et al. | .... 307/10.3 |
| 5,963,177 A | 10/1999 | Tuttle et al. | |
| 5,972,152 A | 10/1999 | Lake et al. | |
| 5,972,156 A | 10/1999 | Brady et al. | |
| 5,983,347 A | * 11/1999 | Brinkmeyer et al. | ....... 307/10.2 |
| 5,988,510 A | 11/1999 | Tuttle et al. | |
| 6,037,879 A | 3/2000 | Tuttle | |
| 6,130,602 A | 10/2000 | O'Toole et al. | |
| 6,285,295 B1 | * 9/2001 | Casden | ...................... 340/10.3 |

FOREIGN PATENT DOCUMENTS

| | | |
|---|---|---|
| DE | 196 45 083 | 5/1998 |
| EP | 0 562 292 | 2/1993 |

* cited by examiner

Primary Examiner—Brian Zimmerman
(74) Attorney, Agent, or Firm—Wells St. John P.S.

(57) ABSTRACT

A wireless identification device including a housing; circuitry in the housing configured to provide a signal to identify the device in response to an interrogation signal; and a selectively actuated switch supported by the housing and controlling whether the circuitry identifies the device. A method of manufacturing a wireless identification device, the method comprising configuring circuitry to provide a signal to identify the device in response to an interrogation signal; coupling the circuitry to a push-on/push-off switch supported by the housing and controlling whether the circuitry provides the signal to identify the device; and encasing the circuitry in a housing such that the switch is actuable from outside the housing by touching a portion of the housing.

35 Claims, 5 Drawing Sheets

WIRELESS IDENTIFICATION DEVICE, RFID DEVICE WITH PUSH-ON/PUSH OFF SWITCH, AND METHOD OF MANUFACTURING WIRELESS IDENTIFICATION DEVICE

CROSS REFERENCE TO RELATED APPLICATION

This patent application is a Continuation Application of U.S. patent application Ser. No. 08/943,889 filed Oct. 3, 1997, entitled "Wireless Identification Device, RFID Device With Push-On/Push-Off Switch, and Method of Manufacturing Wireless Identification Device," naming Mark E. Tuttle as inventor, the disclosure of which is hereby incorporated herein by reference.

TECHNICAL FIELD

This invention relates to radio frequency communication devices. More particularly, the invention relates to radio frequency identification devices for inventory control, object monitoring, determining the existence, location or movement of objects, or for remote automated payment.

BACKGROUND OF THE INVENTION

As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another electronic identification system utilizes a large active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Electronic identification systems can also be used for remote payment. For example, when a radio frequency identification device passes an interrogator at a toll booth, the toll booth can determine the identity of the radio frequency identification device, and thus of the owner of the device, and debit an account held by the owner for payment of toll or can receive a credit card number against which the toll can be charged. Similarly, remote payment is possible for a variety of other goods or services. An electronic identification system which can be used as a radio frequency identification device, and various applications for such devices are described in detail in commonly assigned U.S. patent application Ser. No. 08/705,043, filed Aug. 29, 1996, now U.S. Pat. No. 6,130,602, and incorporated herein by reference.

For active devices, battery drain is an important issue. The battery may be drained by spurious emissions of the radiation necessary to activate a radio frequency identification device. A power conservation problem is posed by such implementations where batteries are used to supply power to the circuitry of the radio frequency identification device. If the circuitry operates continuously at full power, battery life will be short, and device will have to be frequently replaced. If the battery is permanently sealed in a housing, replacement of the battery will be difficult or impossible. One reason for sealing the battery with the circuitry in a housing is to simplify the design and construction, to reduce the cost of production, and protect the electrical interconnections between devices. Another reason is protection of the battery and circuitry from moisture and contaminants. A third reason is to enhance the cosmetic appeal of the device by eliminating the need for an access port or door otherwise necessary to insert and remove the battery. When the battery is discharged, the entire device is then discarded. It is therefore desirable in such embodiments applications to employ power conservation techniques in order to extend useful life.

Additionally, for security control, a holder of an active or passive radio frequency identification device may want to prevent unwanted reading of the radio frequency identification device. One potential problem with existing radio frequency identification devices, particularly those with large communication ranges, is that the holder of the device may not have control over when the device is being interrogated. There are times when the holder would want the device to be interrogated, such as to authorize payment. On the other hand, there are other times when the holder would not want the device to be interrogated. For example, if the device is interrogated to seek payment for a particular service, another service provider who is related to or has a marketing deal with the first service provider may seek to solicit business from the holder when the holder enters the premises of the second service provider. There may be sensitive information on the device, such as health information, address information, purchase histories, credit information, that the holder would not want to have accessed without knowledge or approval.

Therefore, there is a need to provide a holder of a radio frequency identification device with the ability to control whether the device is interrogated.

SUMMARY OF THE INVENTION

The invention provides a wireless identification device including a housing, and circuitry in the housing configured to provide a signal to identify the device in response to an interrogation signal. A selectively actuated switch is supported by the housing and permits operation of the circuitry only while the switch is actuated.

In one aspect of the invention, the switch is a momentary switch.

One aspect of the invention provides a RFID device including a push button switch which, when pushed, allows the RFID device to become active until the switch is pushed again. The user of the device has control over when the RFID device responds to an interrogator.

In one aspect of the invention, the RFID device includes a wireless receiver, and the switch controls the receiver. In another aspect of the invention, pushing the switch toggles the receiver between being enabled and disabled.

In one aspect of the invention, the switch is a momentary switch which causes circuitry to latch a signal which enables the device. When the switch is pressed again the circuitry latches the device into a disabled or inactive mode.

One embodiment of the invention provides a radio frequency identification device comprising an integrated circuit including a receiver, a transmitter, and a microprocessor. In one embodiment, the integrated circuit is a monolithic single die single metal layer integrated circuit including the receiver, the transmitter, and the microprocessor. The device of this embodiment includes an active transponder, instead of a transponder which relies on magnetic coupling for power, and therefore has a much greater range.

Another aspect of the invention provides a method of manufacturing a wireless identification device. Circuitry is configured to provide a signal to identify the device in response to an interrogation signal. The circuitry is coupled to a push-on/push-off switch supported by a housing. The switch controls whether the circuitry provides the signal to identify the device. The circuitry is encased in a housing such that the switch is actuable from outside the housing by touching a portion of the housing.

BRIEF DESCRIPTION OF THE DRAWINGS

Preferred embodiments of the invention are described below with reference to the following accompanying drawings.

FIG. 9 is a circuit schematic of the latch of FIG. 1 illustrating details of construction of a latch included in the circuit in accordance with one embodiment of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
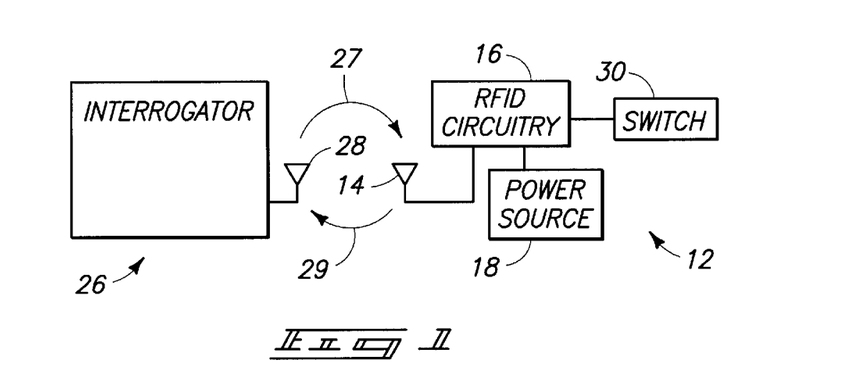
FIG. 1 is a high level circuit schematic showing an interrogator and a radio frequency identification device embodying the invention.

FIG. 1 illustrates a radio frequency data communication device 12 in accordance with one embodiment of the invention. In the illustrated embodiment, the radio frequency data communication device 12 includes RFID circuitry 16. In the illustrated embodiment, the RFID circuitry is defined by an integrated circuit as described in the above-incorporated patent application Ser. No. 08/705,043, filed Aug. 29, 1996. Other embodiments are possible. A power source 18 is connected to the integrated circuit 16 to supply power to the integrated circuit 16. In one embodiment, the power source 18 comprises a battery. In an alternative embodiment, the power source 18 comprises a magnetic coil that receives power via magnetic coupling from an external reader as is known in the art; e.g., as disclosed in U.S. Pat. No. 5,113, 184 to Katayama. The device 12 further includes at least one antenna 14 connected to the circuitry 16 for radio frequency transmission and reception by the circuitry 16.

The device 12 transmits and receives radio frequency communications to and from an interrogator 26. Preferably, the interrogator unit 26 includes an antenna 28, as well as dedicated transmitting and receiving circuitry, similar to that implemented on the integrated circuit 16.

Generally, the interrogator 26 transmits an interrogation signal or command 27 via the antenna 28. The device 12 receives the incoming interrogation signal via its antenna 14. Upon receiving the signal 27, the device 12 responds by generating and transmitting a responsive signal or reply 29. The responsive signal 29 typically includes information that uniquely identifies, or labels the particular device 12 that is transmitting, so as to identify any object or person with which the device 12 is associated. The device 12 includes a selectively actuated switch 30. In the illustrated embodiment, the switch 30 is a push-on/push-off switch controlling whether the circuitry 16 provides the responsive signal to identify the device. In one embodiment, the switch 30 is a momentary, touch actuated switch. More particularly, the switch 30 is a momentary, pressure sensitive switch.

In the illustrated embodiment in FIG. 1, there is no communication between devices 12. Instead, the devices 12 respectively communicate with the interrogator 26. Multiple devices 12 can be used in the same field of an interrogator 26 (i.e., within communications range of an interrogator 26). Similarly, multiple interrogators 26 can be in proximity to one or more of the devices 12.

The radio frequency data communication device 12 can be included in any appropriate housing or packaging. Various methods of manufacturing housings are described in commonly assigned U.S. patent application Ser. No. 08/800, 037, filed Feb. 13, 1997, now U.S. Pat. No. 5,988,510, and incorporated herein by reference.

Figure 2:
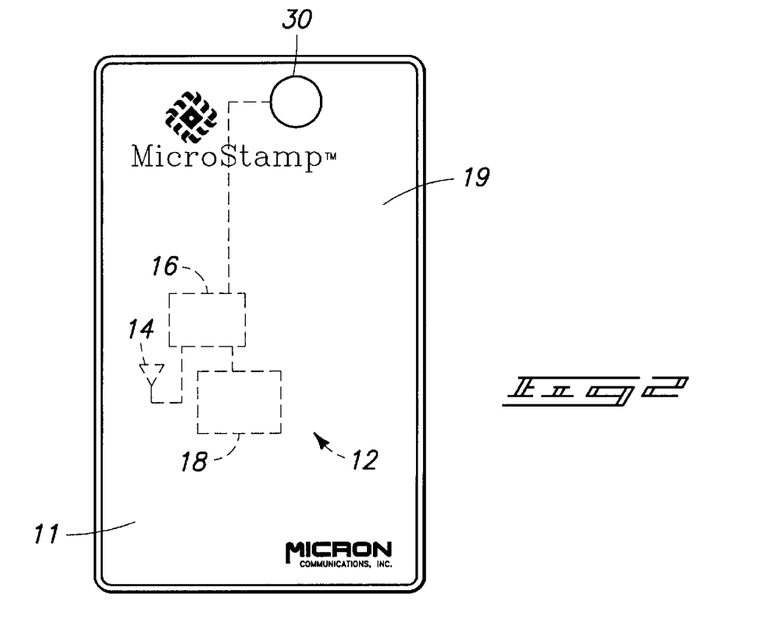
FIG. 2 is a front view of a housing, in the form of a badge or card, supporting the circuit of FIG. 1 according to one embodiment the invention.

FIG. 2 shows but one embodiment in the form of a card or badge 19 including the radio frequency data communication device 12, and a housing 11 including plastic or other suitable material. In one embodiment, the front face of the badge has visual identification features such as graphics, text, information found on identification or credit cards, etc. The switch 30 is supported by the housing 11.

Figure 3:
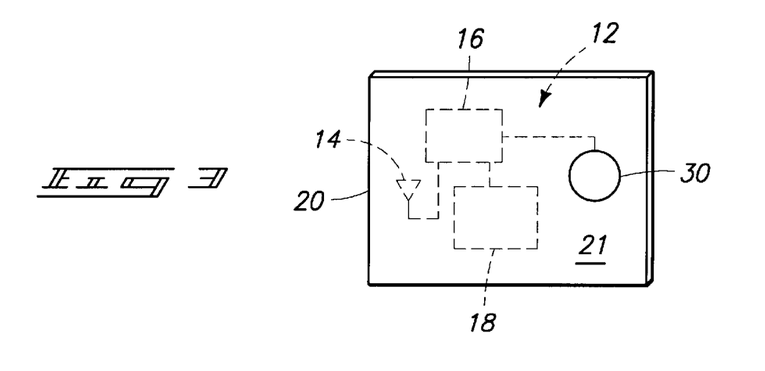
FIG. 3 is a front view of a housing supporting the circuit of FIG. 1 according to another embodiment of the invention.

FIG. 3 illustrates but one alternative housing supporting the device 12. More particularly, FIG. 3 shows a miniature housing 20 encasing the device 12 to define a tag which can be supported by an object (e.g., hung from an object, affixed to an object, etc.). The switch 30 is supported by the housing 20 for this embodiment, as well.

Although two particular types of housings have been disclosed, the device 12 can be included in any appropriate housing.

If the power source 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 18 comprises a series connected pair of button type cells. Instead of using a battery, any suitable power source can be employed.

Figure 4:
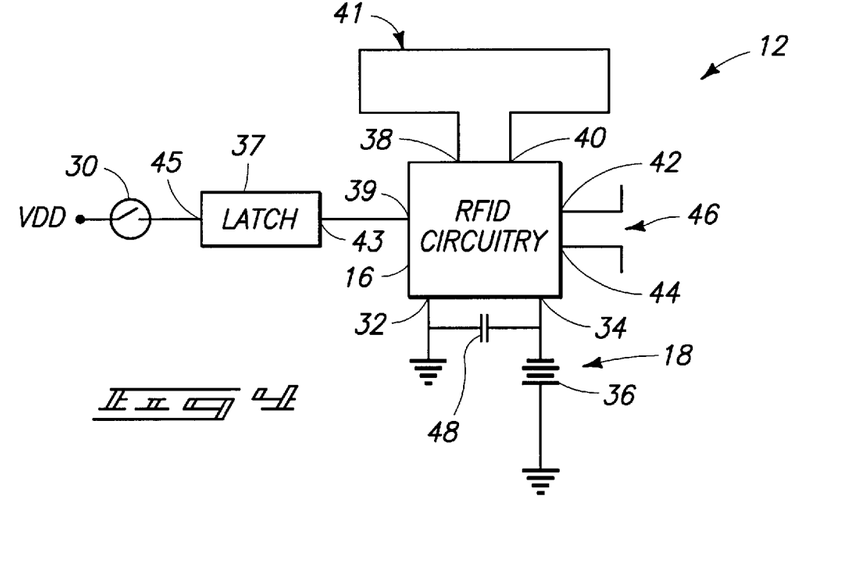
FIG. 4 is a circuit schematic of an active radio frequency identification device in accordance with one embodiment of the invention.
Figure 8:
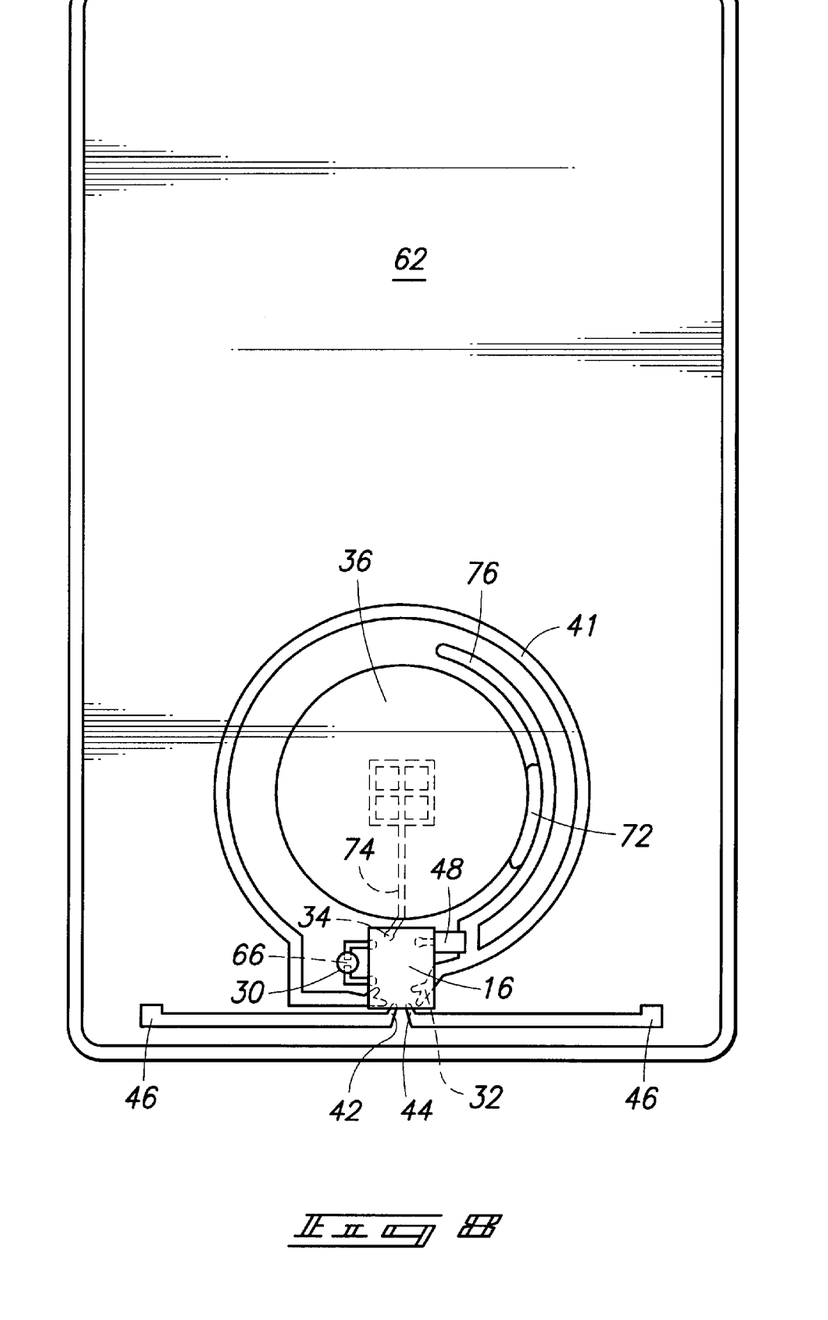
FIG. 8 is a plan view showing construction details of the radio frequency identification device of FIG. 1 illustrating the location of the switch within the circuit, in accordance with one embodiment of the invention.

In one embodiment, shown in FIG. 4, the circuitry 16 includes a modulator or backscatter transmitter and is configured to provide a signal responsive to an interrogation by the interrogator 26 other than by magnetic coupling. The circuitry 16 includes an active wireless transponder. In other words, the circuitry 16 includes a transponder that transmits other than via magnetic coupling and that receives its power other than via magnetic coupling. For example, in the embodiment shown in FIG. 4, the circuitry 16 includes power terminals 32 and 34, and the device further includes a battery 36 coupled to the circuitry 16, via the switch 30, supplying power to the circuitry 16. In the embodiment shown in FIG. 4, the device 12 further includes a latch 37 coupled to the circuitry 16. The latch 37 toggles the circuitry 16 between being enabled and disabled. In the embodiment shown in FIG. 4, the circuitry 16 may include volatile memory because the switch 30 does not disconnect the battery 36 from the circuitry 16. In one embodiment, (FIGS. 4, 5, and 9) the latch 37 comprises circuitry external of circuitry 16. In an alternative embodiment (FIG. 8), the latch 37 is included in the circuitry 16. In the embodiment of FIG. 8, circuitry defining the latch 37 is added to the integrated circuit described in the above-incorporated U.S. patent application Ser. No. 08/705,043.

The circuitry 16 further includes a backscatter transmitter and is configured to provide a responsive signal to the interrogator 26 by radio frequency. More particularly, in the embodiment shown in FIG. 4, the circuitry 16 includes a transmitter, a receiver, and memory such as is described in above-incorporated U.S. patent application Ser. No. 08/705, 043. In another embodiment, the circuitry 16 is formed on a printed circuit board, and the switch 30 is added to the printed circuit board as a standard component (e.g., a conventional switch is employed for the switch 30). This will allow PC board RFID products to be activated as needed.

In the illustrated embodiment, the switch 30 controls the receiver. More particularly, pushing the switch toggles the receiver between being enabled and disabled. More particularly, the circuitry 16 includes an input 39 for enabling or disabling the receiver included in the circuitry 16, and the latch 37 has an output 43 coupled to the input 39 of the circuitry 16, and an input 45. The switch 30 is coupled between a voltage VDD and the input 45 of the latch 37. In the embodiment of FIG. 4, the input 39 for enabling or disabling the receiver is an active low input $\overline{\text{RXEN}}$.

The circuitry 16 further includes antenna terminals 38 and 40 for a first antenna 41, and antenna terminals 42 and 44 for a second antenna 46. One of the antennas 41 and 46 is a send or transmit antenna, and the other of the antennas 41 and 46 is a receive antenna. In the illustrated embodiment, one of the antennas 41 and 46 is a dipole antenna, and the other of the antennas 41 and 46 is a loop antenna. In the illustrated embodiment, the dipole antenna is the send antenna, and the loop antenna is the receive antenna. In alternative embodiments, both antennas 41 and 46 are loop antennas or both antennas 41 and 46 are dipole antennas. Further, in alternative embodiments, a single antenna is used for both sending and receiving. The device of FIG. 4 further includes a decoupling capacitor 48 coupled between the terminals 32 and 34.

Figure 5:
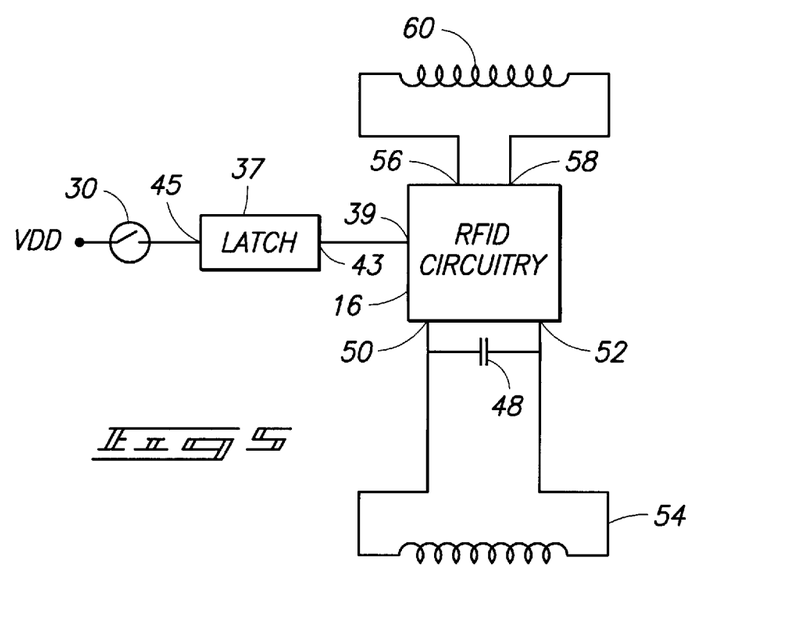
FIG. 5 is a circuit schematic of a passive radio frequency identification device in accordance with one embodiment of the invention.

In another embodiment, shown in FIG. 5, the circuitry 16 is configured to provide a signal responsive to an interrogation by an interrogator by magnetic coupling. The circuitry 16 includes an passive wireless transponder. In other words, the circuitry 16 includes a transponder that transmits via magnetic coupling and that receives its power via magnetic coupling. For example, in the embodiment shown in FIG. 5, the circuitry 16 includes power terminals 50 and 52, and the device further includes a coil 54 coupled to the circuitry 16, via the switch 30, supplying power to the circuitry 16. In the embodiment shown in FIG. 5, the switch 30 enables and disables the receiver included in the circuitry 16 as described above in connection with FIG. 4, like reference numerals indicating like components. Thus, the device of FIG. 5 includes a latch 37 having an input and having an output coupled to a receiver enable input 39 of the circuitry 16. The device of FIG. 5 further includes a switch 30 coupled between a voltage VDD and the input 45 of the latch 37. In the embodiment shown in FIG. 5, the circuitry 16 includes non-volatile memory because the device of FIG. 5 loses power when not magnetically coupled to an interrogator. In the embodiment of FIG. 5, the circuitry 16 further includes a transmitter and is configured to provide a responsive signal to an interrogator by magnetic coupling.

The circuitry 16 of FIG. 5 further includes terminals 56 and 58 for a coil 60 which is used for communications to and from an interrogator by magnetic coupling which power is received by coil 54. In alternative embodiments, separate coils are used for sending and receiving. The device of FIG. 5 further includes a decoupling capacitor 48 coupled between the terminals 50 and 52.

Figure 6:
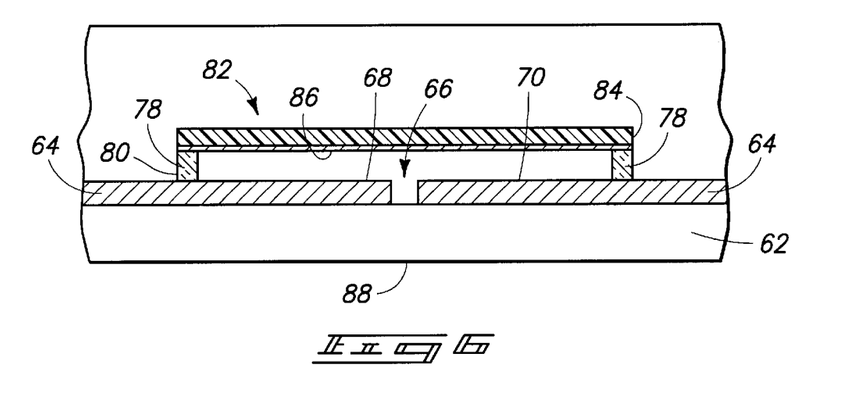
FIG. 6 is a front elevational view, partly broken away, showing construction details of a switch included in the radio frequency identification device of FIG. 1.
Figure 7:
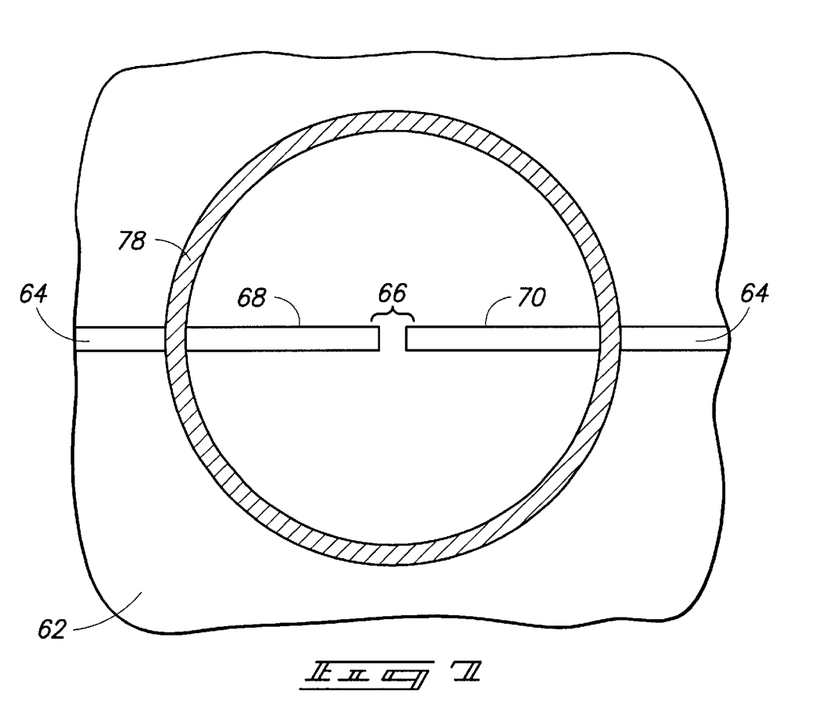
FIG. 7 is a plan view showing construction details of the switch of FIG. 6.

A method of manufacturing a device 12 as shown in FIGS. 2–4 will now be described, reference being made to FIGS. 6–8.

The device 12 includes a housing defined in part by a substrate or layer of supportive material 62. The term "substrate" as used herein refers to any supporting or supportive structure, including, but not limited to, a supportive single layer of material or multiple layer constructions. In the illustrated embodiment, the substrate 62 comprises a polyester film. Other materials are possible. In one embodiment, the polyester film is provided in a roll, using which a number of similar or identical devices are fabricated at the same time and in an assembly line manner. In one embodiment, one or more layers of ink are printed on an inner side of the polyester film facing (after assembly) the back of the device to convey information such as logos and/or company names.

Conductive ink 64 is formed or applied over the substrate 62 and over any ink. In the illustrated embodiment, the conductive ink 64 comprises PTF (polymer or printed thick film; e.g., a polymer filled with flecks of metal such as silver or copper). One manner of forming or applying the conductive ink on the substrate is to screen print the ink on the substrate through conventional screen printing techniques. The conductive ink forms conductive traces for desired electrical connections with and between electronic components which will be described below. In one embodiment, where the smart card is capable of radio frequency communications, the conductive ink is further used to define the antennas 41 and 46 (see FIG. 8). In instances where substrate 62 forms a portion of a larger roll of polyester film material, the printing of conductive ink 64 can take place simultaneously for a number of the to-be-formed devices. A gap 66 is provided along a trace of the conductive ink 64 to define spaced apart ends or terminals 68 and 70 (FIGS. 6 and 7) for the switch 30. The spaced apart terminals 68 and 70 cause an open circuit unless they are electrically coupled together.

Conductive epoxy 72 is applied over desired areas (FIG. 8) using a syringe dispenser to assist in component attachment described just below. In one embodiment, solder is employed instead of conductive epoxy. Referring to FIG. 8, the battery 36 is provided and mounted on each substrate 62 using the conductive epoxy. The battery 36 is preferably a thin profile battery which includes first and second terminals. More particularly, the battery 36 has a lid or negative terminal, and a can or positive terminal. In an alternative embodiment, multiple batteries are provided (e.g., coupled together in series or parallel).

An integrated circuit defining the RFID circuitry 16 is provided and mounted on each of the substrates 62 using the conductive epoxy (e.g., picked and placed using surface mounting techniques). An exemplary and preferred integrated circuitry is described in U.S. patent application Ser. No, 08/705,043 incorporated by reference above. The capacitor 48 is similarly provided and mounted.

The device 12 includes a first or negative battery connection 74 and a second or positive battery connection 76 defined by PTF. The first battery connection is coupled to the integrated circuit by the conductive epoxy, and the second battery connection terminal is coupled to the integrated circuit by the conductive epoxy. In the illustrated embodiment, the battery 36 is placed lid down such that the conductive epoxy makes electrical contact between the negative terminal of the battery and a portion of the first battery connection 74 that extends underneath the lid of the battery in the view shown in FIG. 8.

The battery has a perimetral edge which is disposed adjacent the second battery connection 76. Conductive epoxy is dispensed relative to battery perimetral edge and electrically connects the perimetral edge with an adjacent arcuate portion of the second battery connection 76. In the illustrated embodiment, the perimetral edge defines the can of the battery, such that the conductive epoxy connects the positive terminal of the battery to the battery connection terminal 76.

The conductive epoxy is then cured.

Subsequently, encapsulating epoxy material is provided to encapsulate the substrates, to cover the integrated circuits and batteries, and conductive traces and to define a second housing portion. After application and curing of such epoxy, the a suitable separation or singulation process takes place if multiple devices were formed simultaneously.

At any time after the conductive ink 64 is applied and before the encapsulating epoxy is provided, an insulating ring 78 is placed over a certain portion of the PTF 64. The insulating ring 78 has a periphery 80 and is positioned such that the periphery 80 circumscribes the ends 68 and 70 (see FIG. 7). A diaphragm 82 having a periphery 84 corresponding in size and shape to the periphery 80 of the insulating ring 78 is placed over the insulating ring 78 such that the insulating ring spaces the diaphragm 82 from the ends 68 and 70. The diaphragm 82 has a conductive face 86 facing the ends 68 and 70. Thus, after construction of the device 12, pushing on an area 88 of the flexible substrate 62 causes the ends 68 and 70 to move into contact with the conductive face 86 of the diaphragm 82, thus causing an electrical connection to be made between the ends 68 and 70. The diaphragm 82 does not move away from the ends 68 and 70 because the encapsulant is positioned above the diaphragm 82, and the encapsulant is substantially rigid.

FIG. 8 illustrates a possible location for the gap 66 and thus for the switch 30 within the electrical circuit. In the embodiment of FIG. 8, the gap 66 is not provided along a battery connection. Instead, the embodiment of FIG. 8 is one to be used when the circuitry 16 does not employ non-volatile memory. In the embodiment of FIG. 8, the switch is provided between pins of the circuitry 16 used to control a latch built into the circuitry 16.

Details of construction of a latch 37 are shown in FIG. 9. In the illustrated embodiment, the latch 37 comprises a JK flip-flop 89. Flip-flops are known in the art, and are described, for example, in Digital Logic and Computer Design, by M. Morris Mano, Prentice-Hall, Inc. A JK flip-flop has a J input 90, typically used to set the flip-flop, a K input 92, typically used to clear the flip-flop, a clock input 96 for receiving triggering clock pulses, a reset 98, and a Q output 100. The Q output 100 is coupled to the input 39, $\overline{\text{RXEN}}$, for enabling or disabling the receiver.

In the illustrated embodiment, the J and K inputs 90 and 92 are tied together. More particularly, in the illustrated embodiment, the J and K inputs 90 and 92, and the reset 98 are all tied to the voltage VDD. When inputs are applied to both the J and K inputs of a flip-flop simultaneously, the output of the flip-flop switches to its complement state on each clock pulse. That is, if the output Q was 1 it switches to 0, and vice-versa. The switch 30 is coupled to the clock input 96. The characteristic table for a JK flip-flop is as follows:

| Q | J | K | Q (t + 1) |
|---|---|---|-----------|
| 0 | 0 | 0 | 0 |
| 0 | 0 | 1 | 0 |
| 0 | 1 | 0 | 1 |
| 0 | 1 | 1 | 1 |
| 1 | 0 | 0 | 1 |
| 1 | 0 | 1 | 0 |
| 1 | 1 | 0 | 1 |
| 1 | 1 | 1 | 0 |

An exemplary JK flip-flop that can be used for the flip-flop 89 is a MC74HC73 integrated circuit.

In the illustrated embodiment, the latch 37 further includes a RC network 102 coupled between the switch 30 and the clock input 96 to de-bounce the switch 30.

In an alternative embodiment, a T flip-flop is employed instead of JK flip-flop. A T flip-flop is a single-input version of a JK flip-flop. The design of a T flip-flop is analogous to a JK flip-flop with J and K inputs being tied together.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A radio frequency identification device comprising:
a housing;
circuitry in the housing configured to provide a signal to identify the device in response to an interrogation signal; and
a push on and push off switch supported by the housing and controlling whether the circuitry provides the signal to identify the device.

2. A radio frequency identification device in accordance with claim 1 wherein pushing the switch toggles the receiver between being enabled and disabled.

3. A radio frequency identification device in accordance with claim 2 wherein the circuitry includes volatile memory.

4. A radio frequency identification device in accordance with claim 1 wherein the circuitry includes a transmitter and is configured to provide the signal by radio frequency.

5. A radio frequency identification device in accordance with claim 1 wherein the circuitry includes a modulator and is configured to provide the signal other than by magnetic coupling.

6. A radio frequency identification device in accordance with claim 1 wherein the device includes a coil configured to receive power from an interrogator by magnetic coupling.

7. A radio frequency identification device in accordance with claim 6 wherein the circuitry is configured to provide the signal to the interrogator by magnetic coupling.

8. A radio frequency identification device in accordance with claim 1 wherein the circuitry includes digital circuitry including a digital flag which is set when the switch is pressed and cleared when the switch is released, and wherein the circuitry polls the flag and does not provide the signal to identify the device except when the flag is set.

9. A radio frequency identification device in accordance with claim 8 wherein the circuitry includes volatile memory.

10. A radio frequency identification device comprising:
a housing;
an integrated circuit in the housing including a receiver having an enable input, the receiver being selectively enabled in response to application of a signal of a predetermined voltage value on the enable input, the receiver being configured to receive an interrogation signal when enabled, the integrated circuit further including a transmitter configured to provide a signal to identify the device in response to an interrogation signal; and
a switch supported by the housing and configured to cause the receiver to be enabled in response to being pushed while the receiver is disabled and to cause the receiver to be disabled in response to being pushed while the receiver is enabled, the switch including a first conductor formed of printed thick film and having a first end coupled to the predetermined voltage value and having a second end, a second conductor formed of printed thick film and having a first end coupled to the enable input and having a second end spaced apart from the second end of the first conductor, an insulating ring having a periphery circumscribing the second end of the first conductor and the second end of the second conductor, a diaphragm having a periphery corresponding to the periphery of the insulating ring, and having a conductive face facing the second end of the first conductor and the second end of the second conductor, the conductive face of the diaphragm being spaced apart from the first and second conductors by the insulating ring.

11. A radio frequency identification device in accordance with claim 10 wherein the housing further includes an encapsulant over the diaphragm.

12. A radio frequency identification device in accordance with claim 10 wherein the housing further includes a polyester film substrate, wherein the printed thick film is formed over the substrate, and wherein the housing is configured to effect connection of the second ends of the first and second conductors when pressure is applied to the substrate at location facing the diaphragm.

13. A radio frequency identification device in accordance with claim 10 and further including a battery supplying power to the integrated circuit and to define the predetermined voltage value, and wherein the integrated circuit and the battery are located between the polyester substrate and the encapsulant.

14. A radio frequency identification device in accordance with claim 10 wherein the transmitter is a backscatter transmitter.

15. A radio frequency identification device comprising:
a housing including a substrate, and encapsulant over the substrate;
an integrated circuit in the housing including a receiver having an enable input, the receiver being selectively enabled in response to application of a signal of a predetermined voltage value on the enable input, the receiver being configured to receive an interrogation signal when enabled, the integrated circuit further including a transmitter configured to provide a signal to identify the device in response to an interrogation signal; and
a switch supported by the housing and configured to cause the receiver to be enabled in response to being pushed while the receiver is disabled and to cause the receiver to be disabled in response to being pushed while the receiver is enabled.

16. A radio frequency identification device in accordance with claim 15 wherein the substrate comprises a polyester film.

17. A radio frequency identification device in accordance with claim 15 wherein the switch includes a first conductor formed of printed thick film and having a first end and a second end, a second conductor formed of printed thick film and having a first end and a second end spaced apart from the second end of the first conductor, an insulating ring having a periphery circumscribing the second end of the first conductor and the second end of the second conductor, and a diaphragm having a periphery corresponding to the periphery of the insulating ring and having a conductive face facing the second end of the first conductor and the second end of the second conductor.

18. A radio frequency identification device in accordance with claim 15, wherein the transmitter is a backscatter transmitter.

19. A method of manufacturing a wireless identification device, the method comprising:
configuring circuitry to provide a signal to identify the device in response to an interrogation signal;
coupling the circuitry to a push on and push off switch supported by the housing and controlling whether the circuitry provides the signal to identify the device; and
encasing the circuitry in a housing such that the switch is actuable from outside the housing by touching a portion of the housing.

20. A method of manufacturing a wireless identification device in accordance with claim 19 wherein the coupling comprises coupling the circuitry to a momentary switch.

21. A method of manufacturing a wireless identification device in accordance with claim 19 wherein the coupling comprises coupling the circuitry to a pressure sensitive switch.

22. A method of manufacturing a wireless identification device in accordance with claim 19 wherein the coupling comprises coupling the circuitry to a momentary, touch actuated switch.

23. A method of manufacturing a wireless identification device in accordance with claim 19 wherein the coupling comprises coupling a flip-flop between the switch and the circuitry.

24. A method of manufacturing a wireless identification device in accordance with claim 19 and further comprising providing a battery and coupling the battery to the circuitry.

25. A method of manufacturing a wireless identification device in accordance with claim 24 wherein the encasing comprises encasing the battery and the circuitry.

26. A method of manufacturing a wireless identification device in accordance with claim 19 and further comprising providing a thin profile battery and coupling the battery to the circuitry, and wherein the encasing comprises encasing the battery, the circuitry and the switch.

27. A method of manufacturing a wireless identification device in accordance with claim 19, wherein configuring circuitry to provide the signal comprises configuring circuitry to provide a backscatter signal to identify the device in response to the interrogation signal.

28. A method of manufacturing a wireless identification device, the method comprising:

supporting a battery on a film substrate, the battery having first and second terminals of opposite polarity;

supporting circuitry on the substrate to provide a signal to identify the device in response to an interrogation signal when enabled;

supporting a latch on the substrate, and coupling the latch to the circuitry such that the latch toggles the circuitry between being enabled and disabled;

forming a push on and push off switch on the substrate and coupling the switch to the latch;

coupling the circuitry to the battery to connect the circuitry to the battery; and flowing an encapsulant over the circuitry, latch, switch, and battery to define a housing including the encapsulant and the substrate.

29. A method of manufacturing a wireless identification device in accordance with claim 28 wherein forming the switch comprises printing thick film on the substrate to define a first conductor having a first end coupled to the latch and having a second end, and a second conductor having a first end coupled to the circuitry and having a second end spaced apart from the second end of the first conductor, placing an insulating ring such that its periphery circumscribes the second end of the first conductor and the second end of the second conductor, and placing a diaphragm over the insulating ring, the diaphragm having a periphery corresponding to the periphery of the insulating ring and having a conductive face facing the second end of the first conductor and the second end of the second conductor.

30. A method of manufacturing a wireless identification device in accordance with claim 28, wherein supporting circuitry on the substrate comprises supporting circuitry on the substrate that is configured to provide a backscatter signal to identify the device.

31. A radio frequency identification device in accordance with claim 1, wherein:

the circuitry includes a backscatter transmitter configured to provide a backscatter signal to identify the device in response to an interrogation signal;

the push on and push off switch is configured to control whether the circuitry provides the signal to identify the device by controlling whether the receiver is on or off, and further comprising:

receiver circuitry in the housing, coupled to the transmitter circuitry, and configured to receive the backscatter signal.

32. A radio frequency identification device comprising:

a housing including a polyester film substrate;

an integrated circuit in the housing including a receiver having an enable input, the receiver being selectively enabled in response to application of a signal of a predetermined voltage value on the enable input, the receiver being configured to receive an interrogation signal when enabled, the integrated circuit further including a modulated backscatter transmitter configured to provide a signal to identify the device in response to an interrogation signal; and a switch supported by the housing and configured to cause the receiver to be enabled in response to being pushed while the receiver is disabled and to cause the receiver to be disabled in response to being pushed while the receiver is enabled, the switch including a first conductor formed of printed thick film and having a first end coupled to the predetermined voltage value and having a second end, a second conductor formed of printed thick film and having a first end coupled to the enable input and having a second end spaced apart from the second end of the first conductor, an insulating ring having a periphery circumscribing the second end of the first conductor and the second end of the second conductor, a diaphragm having a periphery corresponding to the periphery of the insulating ring, and having a conductive face facing the second end of the first conductor and the second end of the second conductor, the conductive face of the diaphragm being spaced apart from the first and second conductors by the insulating ring.

33. A radio frequency identification device in accordance with claim 32 wherein the housing further includes an encapsulant over the diaphragm.

34. A radio frequency identification device in accordance with claim 33, further including a battery supplying power to the integrated circuit and to define the predetermined voltage value, and wherein the integrated circuit and the battery are located between the polyester substrate and the encapsulant.

35. A radio frequency identification device in accordance with claim 32 wherein the printed thick film is formed over the polyester substrate, and wherein the housing is configured to effect connection of the second ends of the first and second conductors when pressure is applied to the polyester substrate at location facing the diaphragm.

* * * * *

UNITED STATES PATENT AND TRADEMARK OFFICE
CERTIFICATE OF CORRECTION

PATENT NO. : 6,693,513 B2
DATED : February 17, 2004
INVENTOR(S) : Mark E. Tuttle It is certified that error appears in the above-identified patent and that said Letters Patent is hereby corrected as shown below:

Column 2,
Line 25, replace "therefore desirable in such embodiments applications to" with -- therefore desirable in such embodiments to --

Column 3,
Line 36, replace "emodiment the invention." with -- embodiment of the invention. --

Column 7,
Line 52, replace "the a suitable separation or singulation process takes place if" with -- a suitable separation or singulation process takes place if --

Signed and Sealed this

Twenty-eighth Day of September, 2004

JON W. DUDAS
*Director of the United States Patent and Trademark Office*